United States Patent [19]

Metcalf

[11] Patent Number: 4,634,870

[45] Date of Patent: Jan. 6, 1987

[54] THERMAL IMAGE DYNAMIC RANGE EXPANDER

[75] Inventor: Travis W. Metcalf, El Cajon, Calif.

[73] Assignee: The United States of America as represented by the Secretary of the Navy, Washington, D.C.

[21] Appl. No.: 730,880

[22] Filed: May 6, 1985

[51] Int. Cl.⁴ .............................. G01J 5/38; G01J 5/62
[52] U.S. Cl. .................................... 250/332; 250/350; 250/351; 250/330
[58] Field of Search ............... 250/333, 332, 330, 351, 250/350, 349, 338 R; 358/221, 228

[56] References Cited

U.S. PATENT DOCUMENTS

| 2,766,653 | 10/1956 | Martin et al. | 356/448 |
| 4,063,093 | 12/1977 | Astheimer et al. | 250/330 |
| 4,072,863 | 2/1978 | Roundy | 250/332 |
| 4,107,529 | 8/1978 | Chicklis et al. | 250/339 |
| 4,306,150 | 12/1981 | Dietz | 250/332 |

Primary Examiner—Carolyn E. Fields
Assistant Examiner—Constantine Hannaher
Attorney, Agent, or Firm—Robert F. Beers; Ervin F. Johnston; Thomas Glenn Keough

[57] ABSTRACT

A gas cell array absorbs infrared energy radiated by a viewed scene. A laser interferometer has its resultant intensity changed by the cell's changing length. This is monitored by a vidicon tube that feeds the signal to a digitizer and onto a video display. The incident infrared radiation is chopped into quantized amounts of energy and memory units receive the digitized output of the vidicon tube. Subtractors receive vidicon tube signals simultaneously with quiescent reference levels data. The subtractors form a difference signal by subtracting the quiescent reference level signal from the immediate signal being passed to control threshold detectors. An extended dynamic range of 1,000:1 is accomplished for the preferred embodiment.

4 Claims, 3 Drawing Figures

THERMAL IMAGE DYNAMIC RANGE EXPANDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present inventor was a coinventor on a patent application filed with the U.S. Patent and Trademark Office on Mar. 4, 1985 with the Ser. No. 708,136 and entitled THERMODYNAMICS INFRARED IMAGING SENSOR. In that application a system was reported which provides an image of the thermal gradients in a scene being observed. The specific novelty of that invention resided in an array of gas filled cells which were exposed to the infrared radiation being emitted by the scene being observed.

These gas filled cells are cylindrical in shape with a front window comprising a rigid infrared transmissive window and side walls of a rigid material. The rear surface comprises a flexible membrane which would distort under pressure changes occurring to the gas contained within the cell. The outer surface of the flexible membrane was made to be reflective to visible light. The essence of the invention is a two-dimensional array of thousands of these tiny gas cells positioned against one another such that the infrared transmissive window formed an imaging plane upon which the radiation from the viewed scene could be focused.

Infrared energy from the viewing scene which is focused onto the imaging plane would pass through and cause the gas contained within the respective gas cells to thermodynamically change their state variables of pressure, volume, and temperature. The increase in pressure due to heating from the incident infrared energy would cause the flexible membrane to distort. The amount of distortion is identified as $\Delta L$ which represents a small change in the length to the cylindrical cell. By monitoring and measuring the amount of distortion a measure is obtained of the amount of thermal energy emitted by a portion of the viewed scene. Accordingly, with the matrix array of cells wherein each cell receives infrared radiation from a different part of the viewed scene, a two-dimensional composite record is obtained of the thermal characteristics of the viewed scene.

Changes in $\Delta L$ were measured through the use of a laser interferometer. A signal beam would reflect off the outer surfaces of the flexible membrane and then combine with a reference beam from the laser source. Changes in $\Delta L$ would cause a change in the phase relationship between the two beams that would result in an interference effect on the resultant intensity of the combined interferometer beam. This resultant intensity is measured by a vidicon tube, and is thereafter processed and transmitted to a video screen for visual observation.

As a mathematical example, the resultant intensity produced by the reference beam and signal beam can be represented as two waves of equal frequency and amplitude traveling in the same direction $+x$, but with one a distance $\Delta$ ahead of the other in phase. The equation of the wave representing the reference beam is of the form $$y_1 = A \sin(\omega t - kx)$$

where A represents the amplitude, $\omega$ represents frequency, t is time, k is the wave number, and x represents movement in the x direction. The equation for the wave which represents the signal beam after reflection off the flexible membrane is given as $$y_2 = A \sin[\omega t - k(x+\Delta)]$$

where the wave has moved a distance $x+\Delta$, the $\Delta$ representing the added path length difference caused by $\Delta L$ in the gas cell.

By the principle of superposition, the resultant displacement is the sum of $y_1 + y_2$, and is $$y = 2A \cos \frac{k\Delta}{2} \sin\left[\omega t - k\left(x + \frac{\Delta}{2}\right)\right]$$

where the new amplitude is now represented by the quantity $$2A \cos k \frac{\Delta}{2}.$$

Substituting for the wave number, this equation becomes $$2A \cos\left(\pi \frac{\Delta}{\lambda}\right)$$

where $\lambda$ is the wavelength for the visible light emitted by the laser interferometer source.

The intensity measured by the vidicon tube is proportional to the square of the amplitude. It is recognized that $\Delta = 2\Delta L$. Therefore, as $\Delta L$ would range from 0 through $\lambda/4$ and up to $\lambda/2$, which corresponds to a full wavelength change in $\Delta$, the resultant intensity would range from a maximum value down to a minimum and back up to the maximum. Therefore, as $\Delta L$ ranges beyond a change of one-half wavelength, the resultant intensity at the vidicon tube will become ambiguous and yield intensities of the same value at different lengths for $\Delta L$.

This ambiguity limits the dynamic range and usefulness of the invented thermal imager. It is the recognition of this limitation that has led to the invention presented here.

SUMMARY OF THE INVENTION

The invention comprises a chopper which controls passage of the infrared radiation destined to impinge upon the infrared window surface of the gas cells. The chopper is structured to block incident infrared radiation for preselected portions of time and to allow passage for other preselected portions of time.

The chopper is sized to allow differing, controlled amounts of radiation to pass at preselected times. Specifically, it allows separate passage in amounts of energy equivalent to cause a change in $\Delta L = \lambda/4$ due to a 1° C. temperature difference between the quiescent level when no passage is allowed, and this period of passage. At later, separate times in its operation cycle, it is sized to likewise respond to 10° C. and 100° C. differences.

The chopper then sequentially blocks and allows passage of radiation amounts which account for a dynamic range of 1000 associated with measurements of ΔL between 0 and λ/4. Between each passage period the chopper is sized to block incident infrared radiation and allow the gas cell array to reach a uniform quiescent condition which establishes a calibration reference point. Repeating this cycle provides for continuous observation of the radiating scene.

The laser interferometer intensities which reflect the changes in length ΔL of the gas cells are monitored by the TV vidicon tube which outputs this information as an electrical signal. As described in the prior patent application, Ser. No. 708,136, this signal is converted from analog-to-digital and is fed to a series of memory units. In this invention, a first memory unit receives the signal output from the vidicon tube during the periods the incident infrared radiation is blocked, thereby providing a quiescent reference calibration level. This measurement is stored in the first memory for later retrieval.

When the chopper opens to allow radiation to pass, the intensity level output by the vidicon tube is modified by subtracting the quiescent state intensity from the first memory unit and the resultant maximum of this intensity difference is stored in the second memory unit. As the chopper continues the 10° C. window allows incident infrared radiation to pass. During this period of time the signal output from the vidicon tube is adjusted by subtracting the quiescent reference intensity from it. The resultant maximum of the difference intensity is stored in the third memory unit. The chopper continues to expose the 100° C. opening for transmission of infrared radiation. The intensity of this radiation is again adjusted by subtracting the quiescent state intensity from the first memory unit with the maximum resultant intensity being stored in the fourth memory unit.

At the end of a complete cycle of the chopper the digital values stored in the second, third, and fourth memory units are threshold tested to determine which contains detectable intensity signal levels and this signal is then output for further processing and ultimate visual display.

OBJECTS OF THE INVENTION

An object of the invention is to present a system which will expand the dynamic range for measuring thermal gradients in a scene viewed by a thermodynamic infrared imaging sensor system.

Another object of the invention is to present a system which uses a chopper for cutting a beam of incident infrared radiation into separate integration time magnitudes which can be processed for monitoring temperature changes in a viewed infrared radiating scene over a wide range of temperatures.

These and other objects of the invention will become more readily apparent from the ensuing description when taken with the appended claims and drawings.

DESCRIPTION OF THE PREFERRED EMBODIMENT

Figure 1:
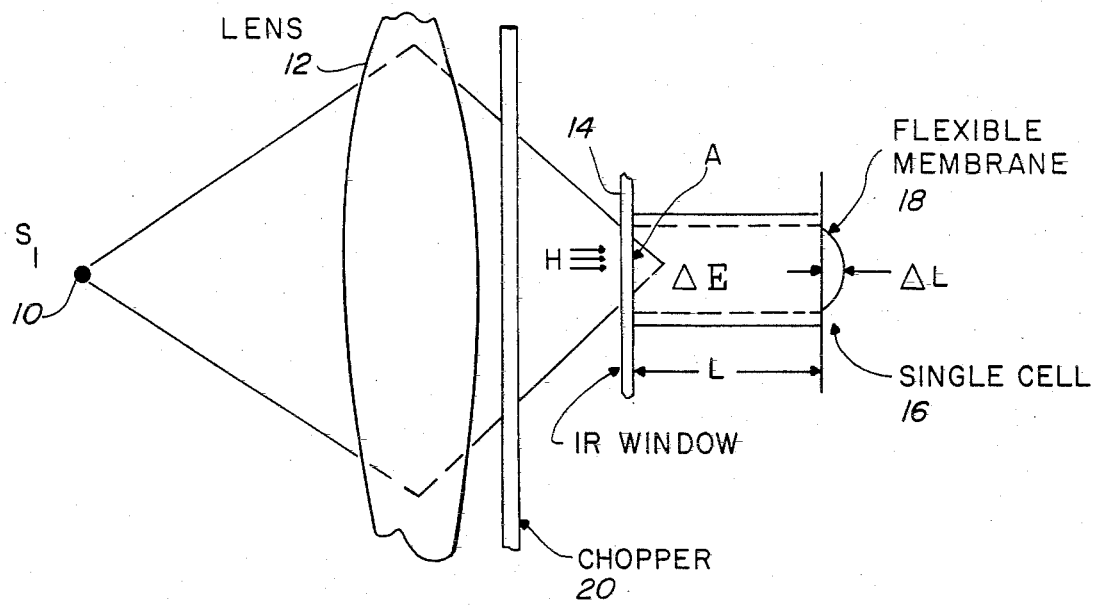
FIG. 1 shows the interaction of infrared radiation from a portion of the viewed scene focused and interacting with a single gas cell.

The structure of a single gas cell contained within the gas cell array used in the Thermodynamics Infrared Imaging Sensor system is presented in FIG. 1. Interaction with a viewed scene that radiates infrared radiation is also displayed. A portion of the viewed scene 10 emits infrared radiation which is focused through lens 12 to impinge upon gas cell 16. Gas cell 16 is constructed with an infrared transmitting window 14 at one end of its cylindrical body and a flexible membrane 18 at the opposite end.

The length of the cylindrical cell is identified by L and the expansion that the flexible membrane can experience is identified as ΔL. The incident radiation represented by H passes through the infrared transmitting window and heats the gas contained inside the cell. ΔE represents the amount of energy absorbed by the gas within the cell. The thermodynamic response within the cell is an increase in pressure which causes expansion and deformation of flexible membrane 18 by an amount ΔL.

A chopper 20 is placed between lens 12 and infrared transmitting window 14. The chopper controls the amount of infrared radiation directed to impinge upon the infrared window. The amount of infrared radiation allowed to reach the infrared window will depend upon the amount let through the chopper and the length of time the radiation is allowed to pass. The combination of these two factors is referred to as the integration time. Generally, the integration time can be controlled by the length of time that the chopper opens to allow passage of the radiation.

Figure 2:
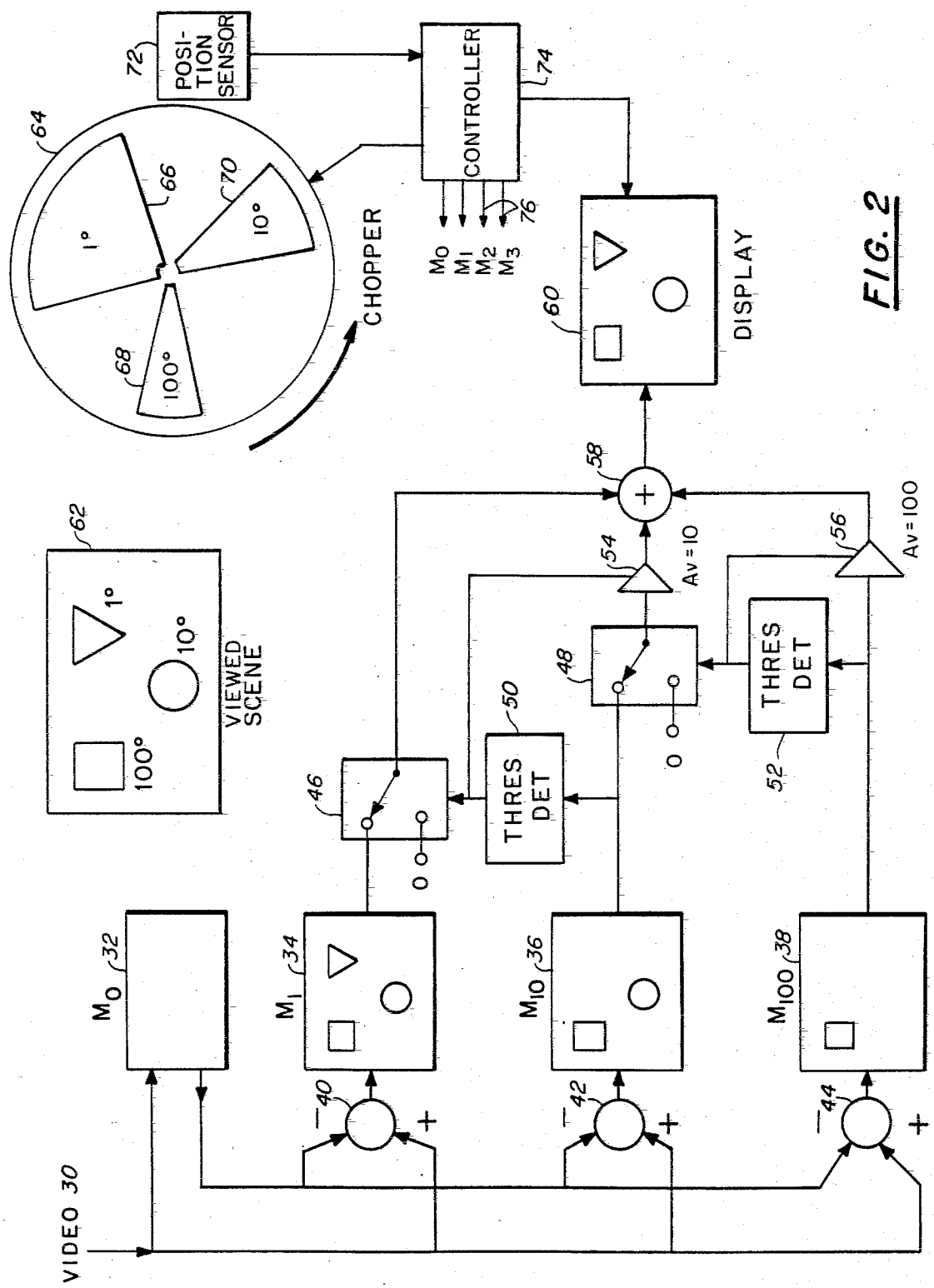
FIG. 2 shows the dynamic range expander in block diagram form.

There are several means for blocking radiation which could be applied as a chopper in this invention. For example, a more likely means would be to use an electronically controlled shutter-type means, or perhaps a polarized material. Such means would have the capability of controlling the passing intensity in a uniform manner. FIG. 2 shows the chopper means as a chopper wheel with certain cut out areas provided to allow passage of the predetermined amount of radiation. The chopper wheel would rotate at a given frequency. Although this method may not be the most efficient to use in this invention it has been selected to help illustrate the concept of the invention.

Assuming a constant rate of revolution, the chopper wheel has been sized with three openings. One opening 66 is designed with an integration time sufficient to allow passage of that amount of radiation necessary to cause expansion of a gas cell by an amount ΔL=λ/4 when the radiation arises from an object in the scene at a temperature of 1° C. above a quiescent condition. The quiescent condition is established when the chopper blocks the incident radiation. A second opening 70 is sized to allow an integration time sufficient to cause ΔL again to expand by the amount λ/4, full scale, when an object in the scene being observed is at a temperature of 10° C. above the quiescent condition. The last opening 68 is sized to similarly make capable the detection at full scale of an object at 100° C. temperature differential. Sufficient areas, or time, is provided between each opening to allow measurement by the thermodynamic infrared imaging sensor of the quiescent condition.

In addition to the chopping means, the range expander system comprises four memory means 32, 34, 36, 38, threshold detectors 50, 52, a controller 74, a chopper means position sensor 72, amplifiers 54, 56, and several adders 40, 42, 44, 58 for combining select signals to be output to a visual display 60. Within the thermodynamics infrared imaging sensor reported in the patent application referred to above, detection of the expansion of the gas cells is accomplished through the use of a laser interferometer which casts a resultant light intensity on a vidicon tube. The vidicon tube thusly monitors the two-dimensional image of the viewed scene, transforming said image into an electrical signal which is then output for further processing. It is at this stage where further components of the thermal image dynamic range expander are connected to process the incoming radiation in a manner that range expansion of the temperatures in the viewed scene can be accomplished.

The video signal 30 output from the vidicon is directed to each memory means 32, 34, 36, 38 of this invention. If we consider a cycle of the chopper wheel as starting at the blanking period just prior to the 1° opening, we recognize that a quiescent state is established. The signal recorded during this quiescent state is directed to and stored in memory means 32. Immediately thereafter the chopper wheel allows passage of the signal through its 1° C. opening 66 to memory unit 34. Simultaneously, the stored quiescent state signal in 32 is also fed to said memory unit. A difference is obtained by subtracting this quiescent signal from the active signal being passed through the 1° C. opening. This difference signal is received by memory means 34 and accordingly stored. The subtraction of the quiescent state signal from the active signals is accomplished through subtracting means 40, 42 and 44.

Following the opening of the 1° C. gap, a second quiescent state may be established. The quiescent state signal is again stored in memory unit 32. This quiescent state also allows for the receiving and monitoring equipment and the gas cell array to return to a common thermodynamic equilibrium position. The chopper now rotates to expose the 10° C. opening 70 to allow radiation to pass. This radiation is again received and adjusted by subtracting the quiescent data from memory means 32. The resultant difference data is fed to memory unit 36. At this point, memory unit 34 has recorded and stored data that could have arrived from any object ranging in temperature from less than 1° C. up to objects at a temperature of 100° C. or above. However memory unit 36 will not record measurements of objects in the viewed scene with a temperature of less than 1° C. Memory means 36 will hold data from objects in the viewed scene at temperatures from less than 10° C. to 100° C., and possibly beyond. Data from objects with the temperature less than 1° C. will approach the noise level for the data stored in memory means 36.

The chopper continues to rotate to again block the incident radiation thereby allowing more quiescent data to be stored in memory unit 32. Following that, the 100° C. window 68 is opened. The signal obtained from radiation passing through the 100° C. window is again adjusted by the quiescent data from memory unit 32 and allowed to be stored in memory unit 38. However, relevant data for objects between 10° C. and 100° C. will only occur in memory unit 38. Data for objects less than 10° C. will be in the noise region and will not register.

At the end of each cycle of operation of the chopper, i.e., each revolution of the chopper as shown in FIG. 2, the stored data in memory units 34, 36 and 38 is output from said memory units and further processed to feed a visual display unit. Timing of the process is accomplished through controller 74. Controller 74 senses the position of chopper wheel 64 by position sensor 72. Controller 74 is also connected to control the motor of chopper 64, or the operational rate of what other chopper means is being utilized. Controller 74 monitors and incorporates sweep synchronization with display means 60. Output means 76 from controller 74 are connected to memory means 32, 34, 36 and 38 to communicate control and command for said units.

Each of memory means 34, 36 and 38 contain information of the objects recorded from the viewed scene 62. This information is of a two-dimensional form and reflects the viewed scene in two dimensions. The data is retrieved from each memory means in serial fashion and is sorted in a manner that confusing or conflicting data from different memory means cannot simultaneously exit to the display.

This is accomplished through the use of threshold detectors 50, 52, switches 46, 48, and amplifying means 54, 56. We consider first a segment of data due to an object at 100° C. in the viewed scene. The segment of data representing this 100° C. object will be stored in all three memory means. Output from memory means 38 would yield a signal above the threshold detector 52 trigger point. Threshold detector 52 would then open switches 48 and 46 and enable amplifier 56. Passage of any data from memory units 34 and 36 is now blocked, and the only data allowed to pass is the actual data from memory unit 38 which is amplified 100× by amplifier 56. After amplification the signal is fed through summer 58 into display unit 60. Consequently, that segment of the signal representing an object at 100° C. in the viewed scene is sorted out and passed onto display without interference from data simultaneously recorded and stored in memory units 34 and 36.

An object at a temperature of up to 10° C. in the viewed scene will have readable data stored in memory units 34 and 36. Data reaching memory unit 38 will be below the threshold level of detector 52 and amplifier 56 will be in its off mode. This inhibits passage of any signal from memory means 38. The signal output by memory means 36 will trigger threshold detector 50. Threshold detector 50 thereupon causes switch 46 to open which inhibits passage of any data from memory means 34. Threshold detector 50 also enables amplifier 54.

The signal output from memory means 36 passes through the closed switch 48 and is amplified 10× by amplifier 54. The signal then goes through summer 58 and passes on to display unit 60. Consequently, during this period, only that signal which originated from a 10° C. object in the viewed scene is allowed to pass to display unit 60.

For a 1° C. object in the viewed scene neither threshold detector 50 or 52 will be activated. Consequently, amplifiers 54 and 56 are off and inhibit passage of any signals from memory units 36 and 38. As a result only that signal stored in memory unit 34 is allowed to pass to summer 58 and onto the display means 60. Therefor, for this condition, only that data corresponding to an object at 1° C. or less is allowed to pass.

An alternative configuration for amplifier 54 and 56 would be to place amplifier 54 between memory means 36 and detector 50 and amplifier 56 between memory means 38 and detector 52. The threshold detector would be adjusted so that when the signal levels output from the respective memory means exceed a preset level, say 10% of full scale for the respective amplifier, then the threshold detector would open switch 46 and/or 48, as appropriate.

The resultant serial signal output through adder 58 is appropriately processed for video display on means 60 to reflect in two-dimensional fashion the infrared content of viewed scene 62. Further processing of the data output by adder 58 is also possible as an alternative to, or in conjunction with, the display means 60.

As a result of this invention, scenes with large thermal gradients can be imaged. The thermodynamic Thermal Image Dynamic Range Expander provides the ability to visually monitor a scene with a dynamic range of 1,000:1. Temperature differences between a quiescent reference point and objects in the scene of up to 100° C. are monitored and imaged onto a visual two-dimensional display. It is clear that the dynamic range selected for a system designed according to this invention may be altered according to specific requirements. Changing dynamic range as well as sensitivity over a preselected full scale range is readily accomplished by adjusting the allowable integration times for the periods that radiation is allowed to pass. It is conceivable that instead of expanding on a base 10 mode one could expand the range on a base 2 mode. In such a mode the memory units and supporting apparatus would be designed to store data up to maximum ratios of $2^n$ where n would represent the number of storing means utilized. Such a design would not provide the large scale magnification presented in the above description, but would provide reasonable amplification along with higher sensitivity capability at the radiated temperatures.

Figure 3:
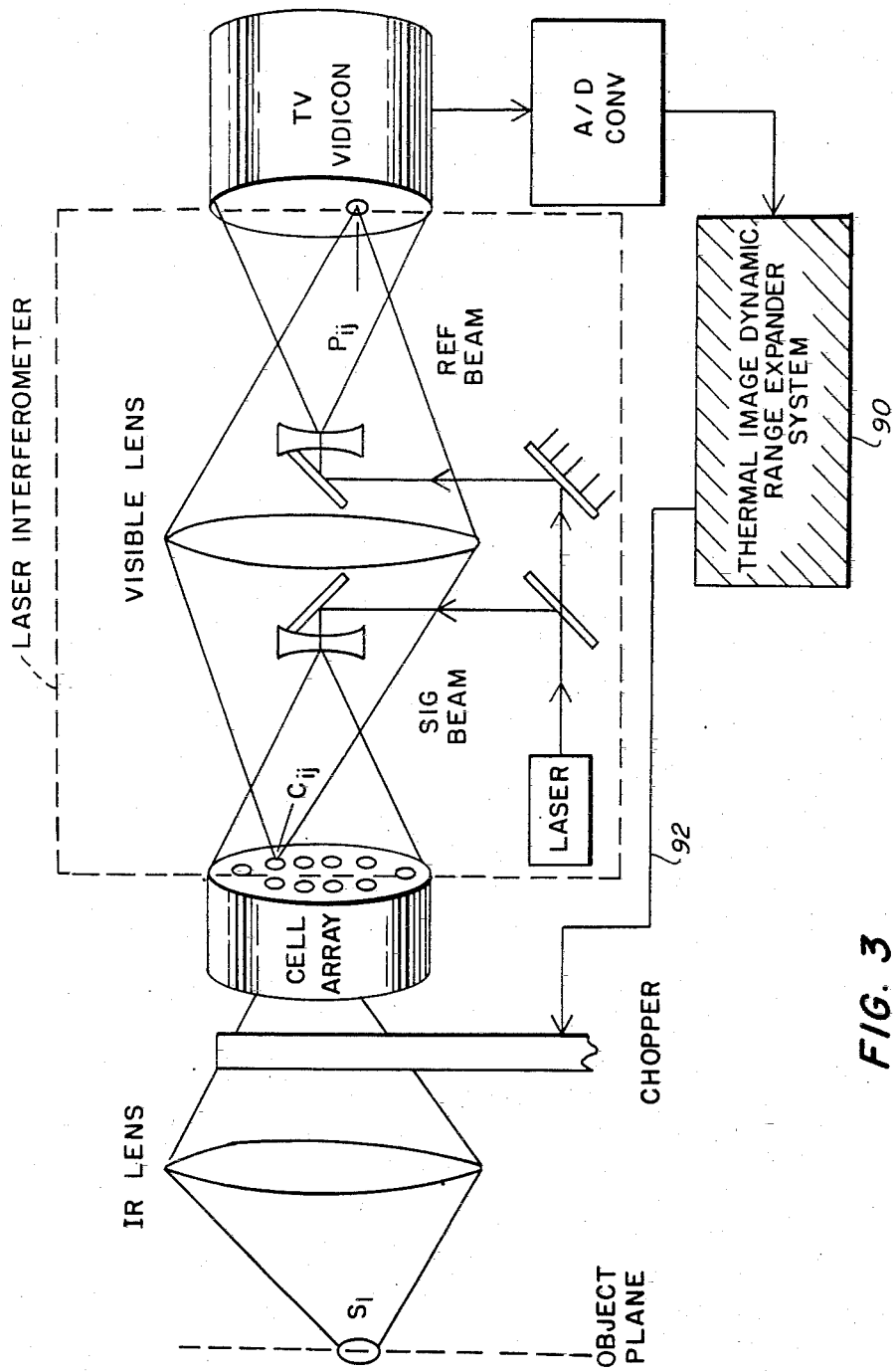
FIG. 3 shows the connection of this invention with the prior art Thermodynamics Infrared Imaging Sensor.

FIG. 3 shows the arrangement of this invention within the prior art system, the Thermodynamics Infrared Imaging Sensor of the above referenced patent application. The key features are clearly obvious, e.g. the portion of the scene viewed $S_1$ within the object plane, the IR lens, the chopper, the cell array, the laser interferometer, the vidicon, the A/D converter, and this invention 90 with its connection 92 to the chopper. The laser interferometer comprises a laser whose beam is split into a signal beam and reference beam by mirrors. The signal beam is focused to reflect from the gas cells $C_{ij}$ in the cell array and is recombined with the reference beam. It is then focused to impinge at $P_{ij}$ on the TV vidicon.

Obviously, many modifications and variations of the present invention are possible in the light of the above teachings. It is therefore to be understood that within the scope of the appended claims the invention may be practiced otherwise than as specifically described.

I claim:

1. An apparatus for dynamic range expansion to be used with a gas cell infrared imaging sensor system which contains an array of expandable gas cells oriented to receive incident infrared radiation emitted from a scene being viewed; a laser interferometer with a signal beam that monitors the expansion of the gas cells and a reference beam that is interferometrically combined with the signal beam; a television vidicon tube which senses the resultant intensity of the combined signal and reference beams; a digitizer for converting the signal output from the vidicon tube to digital format; and a video display which displays the visualized image of the viewed scene; said apparatus for dynamic range expansion comprising:

means for regulating the amount of incident infrared radiation reaching the gas cells;

means, connected to the digitizer, for storing a digitized quiescent reference level signal from the digitizer that converts the signal output from the vidicon tube, said reference level signal occuring when the means for regulating completely blocks passage of the incident infrared radiation to the gas cells;

a plurality of subtracting means with each subtracting means having one input connected to the digitizer that converts the signal output from the vidicon tube and a second input connected to the output of the means for storing, wherein each subtracting means creates a difference signal by subtracting the stored quiescent reference level signal from an immediate signal being output from the digitizer;

a plurality of holding means with each holding means connected to a subtracting means such that each holding means stores a preselected portion of the difference signal;

means for controlling connected to the means for regulating, the video display, and the holding means, such that said means for controlling synchronizes the combined operation of the means for regulating, the video display, and the various holding means;

means for switching connected to the outputs of the holding means, said means for switching allowing only one predetermined holding means to output its stored signal at a time; and means for amplifying connected to the output of the means for switching, such that said means for amplifying multiplies an output signal by a preset factor, said preset factor determined by which holding means output said signal through the means for switching, and wherein a signal output from said amplifying means is then transmitted onto the video display.

2. An apparatus for dynamic range expansion to be used with a gas cell infrared imaging sensor system which contains an array of expandable gas cells oriented to receive incident infrared radiation emitted from a scene being viewed; a laser interferometer with a signal beam that monitors the expansion of the gas cells and a reference beam that is interferometrically combined with the signal beam; a television vidicon tube which senses the resultant intensity of the combined signal and reference beams; a digitizer for converting the signal output from the vidicon tube to digital format; and a video display which displays the visualized image of the viewed scene; said apparatus for dynamic range expansion comprising:

means for periodically chopping the incident infrared radiation beam into $N-1$ predetermined quantized segments, where N is a preselected positive integer, said segments are allowed to pass to the gas cells with each segment separated by a period during which the incident infrared radiation beam is completely blocked;

a first memory for storing a digitized quiescent reference level signal from the digitizer that converts the signal output from the vidicon tube, said reference level signal occuring during periods when the means for chopping completely blocks passage of the incident infrared radiation to the gas cells;

a plurality of $N-1$ subtractors with each subtractor having one input connected to the digitizer that converts the signal output from the vidicon tube and a second input connected to the output of the first memory, wherein each subtractor creates a difference signal by subtracting the stored quiescent reference level signal from an immediate signal being output from the digitizer;

a plurality of N−1 memories, more specifically a second memory through an Nth memory, with each memory connected to a subtractor, such that each memory stores a preselected portion of the difference signal;

a controller connected to the means for chopping, the video display, and the memories, said controller synchronizing the combined operation of the means for chopping, the video display, and the memories, and said controller governing the synchronization of each memory in a manner that the memories are tasked to store individual difference signals such that the second memory stores the difference signal corresponding with the immediate signal output from the digitizer when the means for chopping is allowing passage of the largest quantized segment of incident radiation, then the third memory stores the difference signal corresponding with the immediate signal occuring for the next to largest quantized segment, and so on until the Nth memory stores the difference signal corresponding with the immediate signal output from the digitizer when the means for chopping is allowing passage of the smallest quantized segment of incident radiation;

a plurality of N−2 threshold detectors connected to the outputs of the third through the Nth memories, said threshold detectors set to initiate control signals when their input signal exceeds their preset threshold level;

a plurality of N−2 switches connected to the outputs of the second through the N−1st memories, with each switch also connected to the threshold detector which is connected to the next higher indexed memory, such that when said next higher indexed memory outputs a difference signal at a level above a preset threshold level at its threshold detector, said threshold detector initiates a control signal which causes the switch to open, so as to inhibit passage of the difference signal stored in the memory connected to said switch;

a plurality of N−2 amplifiers connected to the outputs of the third through the Nth memories, each of said amplifiers having an independent preset amplifying factor, each of said amplifiers also being controllably connected to the threshold detector that is connected to the same memory such that the amplifier is maintained in an inhibit state except when the threshold detector senses a signal output by the memory at a level above the preset threshold level; and a summer connected to the outputs of each of the N−2 amplifiers and to the output of the second memory such that all signals output are conducted to pass on to the video display.

3. An apparatus according to claim 2 wherein the means for periodically chopping further comprises:

means for periodically chopping the incident infrared radiation beam into N−1 quantized segments that are allowed to pass to the gas cells with each segment separated by a period during which the incident infrared radiation beam is completely blocked, said quantized segments allowing passage of a set magnitude $E_o$ of radiation energy by the (N−1)st quantized segment, $10E_o$ by the (N−2)nd quantized segment, $100E_o$ by the (N−3)rd quantized segment, and so on.

4. An apparatus according to claim 3 wherein the plurality of N−2 amplifiers further comprises:

a plurality of N−2 amplifiers connected to the outputs of the third through the Nth memories with the amplification factors set in a manner that the amplifier connected to the third memory has an amplification factor of 10×, the amplifier connected to the fourth memory has an amplification factor of 100×, the amplifier connected to the fifth memory has an amplification factor of 1000×, and so on.

* * * * *